United States Patent
Williams

(10) Patent No.: US 12,126,149 B2
(45) Date of Patent: Oct. 22, 2024

(54) CABLE PULLER AND METHOD OF USE

(71) Applicant: AIS Construction Equipment Corporation, Grand Rapids, MI (US)

(72) Inventor: Rickey D. Williams, Birch Run, MI (US)

(73) Assignee: AIS Construction Equipment Corporation, Grand Rapids, MI (US)

( * ) Notice: Subject to any disclaimer, the term of this patent is extended or adjusted under 35 U.S.C. 154(b) by 526 days.

(21) Appl. No.: 17/570,741

(22) Filed: Jan. 7, 2022

(65) Prior Publication Data

US 2022/0131350 A1    Apr. 28, 2022

Related U.S. Application Data

(62) Division of application No. 16/049,002, filed on Jul. 30, 2018, now Pat. No. 11,258,237.

(51) Int. Cl.
| | |
|---|---|
| *F16L 55/165* | (2006.01) |
| *E21B 17/20* | (2006.01) |
| *F16L 1/028* | (2006.01) |
| *F16L 1/032* | (2006.01) |
| *F16L 55/18* | (2006.01) |
| *H02G 1/08* | (2006.01) |

(52) U.S. Cl.
CPC ........... *H02G 1/081* (2013.01); *E21B 17/206* (2013.01); *F16L 1/028* (2013.01); *F16L 1/032* (2013.01); *F16L 55/18* (2013.01); *F16L 55/1652* (2013.01); *F16L 55/1658* (2013.01)

(58) Field of Classification Search
CPC ..... E21B 17/206; F16L 1/032; F16L 55/1658; F16L 55/18; F16L 1/028; F16L 55/1652; H02G 1/081
USPC ................................. 405/184.3, 184, 184.1
See application file for complete search history.

(56) References Cited

U.S. PATENT DOCUMENTS

| | | | |
|---|---|---|---|
| 3,907,253 A | 9/1975 | Schosek | |
| 5,211,509 A * | 5/1993 | Roessler ................ | F16L 1/065 |
| | | | 405/184 |
| 5,626,442 A * | 5/1997 | Boyer ..................... | E02F 5/10 |
| | | | 405/184.2 |
| 6,171,026 B1 | 1/2001 | Crane et al. | |
| 6,494,437 B1 * | 12/2002 | Boyer .................... | E02F 3/963 |
| | | | 254/323 |
| 8,414,225 B2 | 4/2013 | Tjader | |
| 11,258,237 B2 * | 2/2022 | Williams ................ | F16L 1/032 |

(Continued)

*Primary Examiner* — Mahdi H Nejad
(74) *Attorney, Agent, or Firm* — Warner Norcross + Judd LLP

(57) ABSTRACT

A cable puller and a related method of use are provided. The cable puller includes a frame, a winch mounted to the frame, a frame mount and one or more redirection pulleys that guide a cable. The mount is mountable to an arm of a piece of equipment, e.g., excavator, backhoe, loader, etc., and configured to allow manipulation and tilting of the frame to align the redirection pulley at a level and orientation relative to an underground tubing that is to be decommissioned and/or replaced. A deflection plate can be joined with the frame forward of the pulley to protect the pulley if the cable draws a portion of the underground tubing toward it. A splitting wedge can be joined to the frame to fracture underground tubing drawn toward the plate or pulley. Related methods of use also are provided.

17 Claims, 9 Drawing Sheets

(56) References Cited

U.S. PATENT DOCUMENTS

| | | | |
|---|---|---|---|
| 2013/0156505 A1* | 6/2013 | Tjader | B66D 3/006 |
| | | | 405/184.3 |
| 2014/0241812 A1* | 8/2014 | Herrick | F16B 2/06 |
| | | | 405/184 |
| 2015/0198279 A1 | 7/2015 | Randa et al. | |
| 2017/0089501 A1* | 3/2017 | Tjader | F16L 55/1658 |
| 2020/0036172 A1* | 1/2020 | Williams | H02G 1/081 |
| 2021/0107074 A1* | 4/2021 | Randa | F16L 55/1658 |
| 2022/0329053 A1* | 10/2022 | Fiorentini | H02G 1/08 |

\* cited by examiner

CABLE PULLER AND METHOD OF USE

BACKGROUND OF THE INVENTION

The present invention relates to construction equipment, and more particularly to a cable puller for replacing underground pipes, tubing and conduits.

For years, pipes, tubing and conduits have been buried in the ground to convey gases and liquids, or to protect electrical wires, fiber optics and other structures. Over time, the tubing deteriorates. Such deterioration can be accelerated by soil conditions, internal pressures, above ground loads and other factors. When the tubing deteriorates, it must be removed or replaced with new tubing if there is still a desire to use the structure in an intended manner.

A common way to replace underground tubing is to pull a cable through the tubing with equipment, such as an excavator. The cable has a wedge fixed to one end of the cable so that the wedge moves with the end. The other end is attached to an arm of an excavator. The excavator arm is placed adjacent an end of the underground tubing. The excavator arm moves back and forth toward the tubing. When it moves away from the tubing, it forcibly pulls the cable with the wedge attached to it through the tubing. As this occurs, the wedge moves through the tubing with the cable and ruptures the tubing in the ground. If the wedge is attached to new tubing, the new tubing is pulled along the path, underground where the old tubing previously was located, to replace the old tubing. The arm then moves back toward the tubing in the pit. While this movement occurs, the wedge remains stationary in the underground tubing, and that tubing is not split, so the movement of the arm is basically wasted. The arm is then moved away from the tubing again to repeat another cycle of drawing the wedge through the old tubing to split it.

While the above procedure works to decommission old tubing it suffers some shortcomings. First, about half of the movement of the excavator arm is wasted, due to the back and forth motion, which puts wear and tear on a machine without work being done. Second, when the arm moves, it can alter the direction of cable pull. For example, as the arm gets farther away from the tubing in the hole, or rotates in an arc in which the arm moves, possibly moving up or down, the angle of the cable relative to the old tubing in which it is disposed can change. This can cause the cable to rub on the tubing, causing extra wear on the cable. More significantly, this also can impair the wedge's effectiveness in splitting the old tubing or can cause the wedge to grab the old tubing and start to pull it out of the old tubing hole, and possibly injure a worker at one end of the tubing. Many times, this is not favorable as it produces extra material to dispose of from the old tubing and clutters the area for the worker. It also can pull un-fractured old tubing into the hole along the cable. That un-fractured tubing eventually has to be separated from the cable which requires extra labor and time at the site.

Accordingly, there remains room for improvement in the field of cable pullers to remove and/or replace underground tubing.

SUMMARY OF THE INVENTION

A cable puller and related method is provided including a frame, a winch mounted to the frame, a frame mount and one or more redirection pulleys that guide a cable. The frame mount can be mountable to an arm of a piece of equipment, and configured to allow manipulation and/or tilting of the frame to align the pulley at a level and orientation relative to an underground tubing that is to be decommissioned and/or replaced.

In one embodiment, the cable puller can include multiple pulleys mounted to the frame, one above the other. The pulleys can be displaced vertically, and located at different levels of the frame. With these different pulleys on different levels, the cable puller can be placed in a drawing pit and vertically moved within the pit to align one of the pulleys with the underground tubing that projects into or faces toward the pit. This can enable the cable puller to achieve a relatively straight pull on the cable through the tubing to prevent binding and/or excess cable wear.

In another embodiment, the cable puller includes a deflection plate joined with the frame forward of the pulley to protect the pulley if a portion of the underground tubing is drawn toward it. The deflection plate can be curved or angled and placed adjacent the pulley so as to protect the first pulley and prevent the underground tubing from contacting the winch. The deflection plate can include one or more apertures through which the cable can be drawn from the ground to the pulley and winch.

In still another embodiment, the cable puller includes a splitting wedge joined with the frame and generally fixed and stationary relative thereto. The splitting wedge can define a cable bore and a tapered exterior surface, and can generally point away from the pulley toward the underground tubing. The cable is not fixed to the splitting wedge, and can move through and relative to the splitting wedge. The tapered exterior surface can engage the underground tubing pulled toward the pulley to fracture that underground tubing before it reaches the pulley. This can break up and fracture the underground tubing so the same need not be done manually, and can prevent the tubing from being wrapped with the cable around the pulley and/or the winch.

In yet another embodiment, a method of engaging underground tubing is provided. The method can include placing a cable puller into a drawing pit below ground level; moving the cable puller to align a pulley of the cable puller with underground tubing, the first pulley being located below ground level; and pulling a cable with a winch of the cable puller over the pulley so the first pulley rotates and so a first splitting wedge attached to the cable is drawn through the underground tubing, optionally splitting the underground tubing with a splitting wedge joined with a distal end of the cable.

In even another embodiment, the method can include attaching the cable puller to an arm of a piece of equipment, such as an excavator, a backhoe, a loader or the like; extending a ram on the arm to pivot and/or tilt a frame of the cable puller about an axis; and aligning the first pulley generally in line with the underground tubing as a result of the extending. Optionally, the cable puller can include a quick attach mount that enables the cable puller to be quickly mounted and detached from the equipment.

In a further embodiment, the method can include selecting one pulley over another pulley in a set of two or more pulleys so as to helpfully align the selected pulley with the underground tubing. The one or more pulleys in the set can be disposed vertically above or below the first pulley. The selection can be based on the proximity of a pulley to the tubing, that is, the pulley that is closest in height to the tubing when the puller is in the drawing pit can be selected. The selection can be performed by an operator at the site, and based on visual perception of the level of the pulleys and the level of the tubing.

In still a further embodiment, the method can include disposing a deflector plate between the selected pulley and the underground tubing during the pulling. The pulley can redirect the cable toward the winch during the pulling. The deflector plate can deflect underground tubing pulled toward the pulley in a direction away from the pulley and/or the winch during the pulling.

In a yet a further embodiment, the method can include engaging an un-fractured portion of underground tubing pulled toward the pulley against a splitting wedge fixedly mounted to the frame, and optionally adjacent the deflector plate. The splitting wedge can fracture the un-fractured portion as the un-fractured portion moves toward the pulley. As a result, the un-fractured portion becomes a split or fractured portion of the tubing and falls away from the splitting wedge. The splitting wedge can be used in conjunction with the deflector plate to further split and deflect parts of fractured tubing. This can result in quick and easy removal of the drawn tubing from the cable so that tubing does not interfere with the pulley and/or winch to interrupt the operation of these components.

The current embodiments of the cable puller and related method of use provide benefits in cable pulling to decommission, remove and/or replace underground tubing, pipes and/or conduits that previously have been unachievable. These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DESCRIPTION OF THE CURRENT EMBODIMENTS

Figure 1:
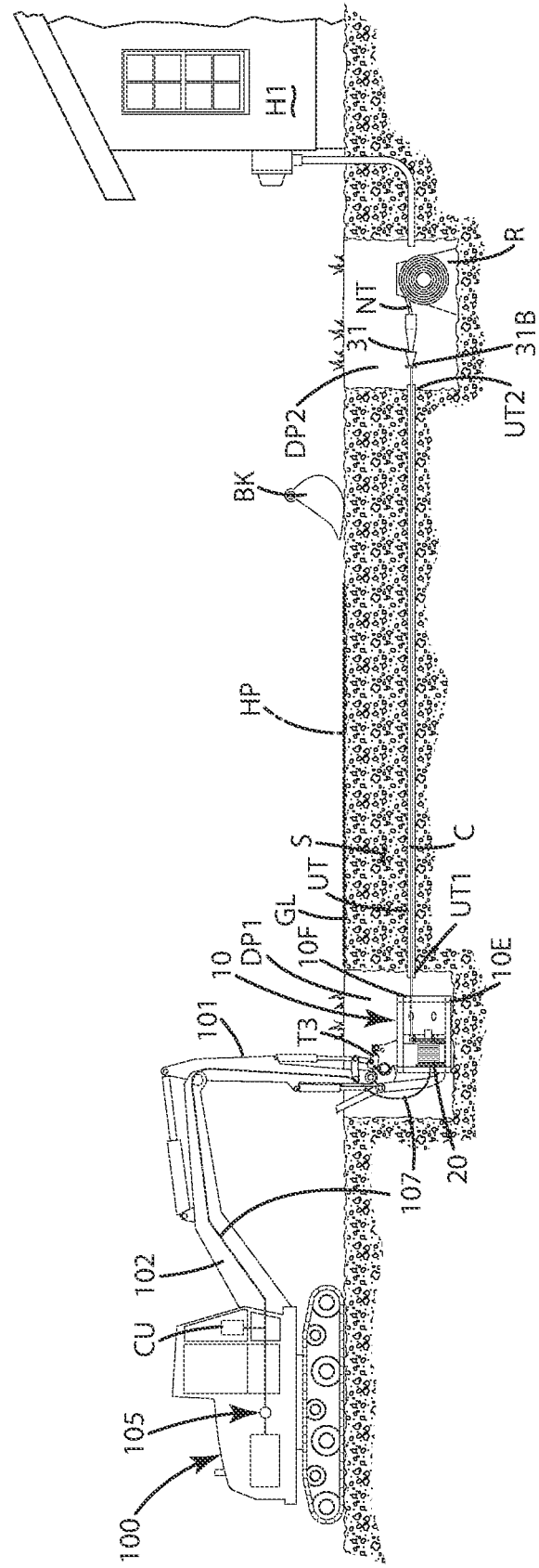
FIG. 1 is a perspective view of a cable puller of a current embodiment mounted to a piece of equipment and configured to pull a splitting wedge through old underground tubing to decommission the same.

A current embodiment of the cable puller is illustrated in FIGS. 1-8, and generally designated 10. With reference to FIG. 1, the cable puller 10 is constructed for attachment to a piece of equipment 100. This piece of 100 can be any equipment capable of raising, lowering or otherwise moving the cable puller 10. As illustrated, the piece of equipment 104 is an excavator. Other equipment such as a backhoe, a loader, a Hi-Lo or other types of equipment can be used. The illustrated excavator 100 can include a first arm 101 and a second arm 102 that are movable relative to one another about a joint. The first arm 101 can include a ram 103 that can be utilized to level, tilt and/or otherwise move the cable puller 10 in a variety of directions as described below. The ram 103 can be a hydraulic ram that is configured to extend and retract based on the input of fluid into and/or out from the ram 103. The ram 103 can be plumbed to a hydraulic system 105 of the excavator 100 which is operated and pressurized via a hydraulic pump 106. A winch 20 of the cable puller 10 also can be plumbed into the hydraulic system 105 of the equipment 100 via a hydraulic line 107 that establishes fluid and hydraulic communication between the system 105 of the equipment 100 and the winch, so as to power the winch 20 during operation of the cable puller 10 as described below.

With reference to FIG. 1, an exemplary environment in which the cable puller 10 can be utilized is shown. There, the cable puller 10 is used to decommission and/or replace existing underground tubing UT that is buried underground, that is, below ground level GL, in soil or some other material S, depending on the application. In this environment, the tubing can be a copper pipe previously utilized to convey a gas to a building B which can be a residence, business or other structure. The underground tubing UT can be any type of structure, for example, a pipe a conduit or other elongated hollow structures. When in the form of a conduit, the underground tubing UT can further house electrical wire, fiber optics, or other elongated structures that extend within the underground tubing UT. As will be appreciated, the cable puller 10 can be utilized with a variety of different tubing structures. As illustrated, the underground tubing UT is to be split or otherwise fractured so that it no longer has a fully enclosed tubular shape. As further shown, the underground tubing UT in the soil S can be simultaneously replaced with new tubing NT that also is pulled via the cable C with the cable puller 10.

The worksite shown in FIG. 1 can include a first drawing pit DP1 and a second drawing pit DP2. These drawing pits can be dug with the bucket BK when attached to the equipment 100 below ground level GL. These pits can extend into the soil or other material S a preselected distance sufficient to access the underground tubing UT. Generally, the underground tubing UT can project into or be otherwise exposed in the drawing pits. A first end UT1 of the underground tubing UT can be exposed in the first drawing pit DP1 while a second distal end DT2, closer to the building B can be exposed in the second drawing pit DP2.

The underground tubing UT can be replaced with the new tubing NT in the following manner with reference to FIG. 1. The excavator 100 can first dig the drawing pits DP1 and DP2. This digging can be performed with a bucket BK which is attached to the first arm 101 actuated by the hydraulic system 105 of the excavator 100. The bucket BK can be removed from the excavator and in particular the arm after the pits are dug. Then, the cable puller 10 can include a frame mount so, which can be attached to the arm, optionally via a quick attach mount 108 as described further below. The equipment operator or other workers can locate the ends UT1 and UT2 of the existing underground tubing UT buried within the soil S but exposed in the respective pits. A worker can place a role R of new tubing NT in the drawing pit DP2 or in some cases above ground or on another piece of equipment. An operator can manipulate and control the equipment 100 to move the first 101 and second 102 arms with the cable puller 10 mounted to an end of the first arm 101. The operator can manipulate the ram 102 to properly tilt, rotate and/or pivot the cable puller 10 in directions T relative to the arm 101 and relative to the ground level GL and/or a horizontal plane HP. The cable puller 10 can be lowered into the first drawing pit DP1 with the arm 101. The arm 101 can project into the pit and the cable puller 10 can be disposed in the pit below ground level GL. As described further below, a selected pulley 40 of the cable puller 10 can be precisely aligned with the underground tubing UT, in particular, the portion of the underground tubing end UT1 extending or exposed in the drawing pit DPL. The hydraulic ram 103 can be operated to extend and/or retract, thereby tilting the cable puller 10 in one or more directions T so that a pulley is aligned with the underground tubing UT. The tilting also can be performed to orient the cable puller 10 relative to ground level and/or horizontal plane HP depending on the application and the site environment. A worker can extend a cable C by pushing it from the second drawing pit DP2 toward the first drawing pit DPL. This cable C can be spooled off of a holding spool or roll R. The cable C can extend from the second end UT2 of the underground tubing UT to the first end UT1 until an end of the cable C is exposed in the first drawing pit DPL. A worker can thread the cable into the cable puller 10 and to the winch 20. A worker also can attach a first splitting wedge 31 to the end of the cable distal from the cable puller. Optionally, the splitting wedge 31 is joined with the new tubing NT that is spooled on a roll R. The new tubing NT can be configured to replace the old tubing UT.

The winch 20 can be operated by rotating a spool 21 of the winch to draw the cable C through the underground tubing UT. As this occurs, the splitting wedge 31 splits or otherwise fractures the underground tubing UT, in many cases opening a bore in the soil S that is large enough to accommodate the new tubing NT. The new tubing NT, which is connected to the first splitting wedge 31, also is drawn through the bore in the soil where the underground tubing once existed in its pre-fractured on pre-split condition. The winch 20 continues to pull the cable C, which continues to pull the new tubing NT from the role R of new tubing NT until the new tubing NT is sufficiently set in the location where the underground tubing UT once was positioned. The underground tubing UT can be split or fractured with the split pieces disposed in the ground S adjacent the new tubing NT, generally being decommissioned within the soil or ground S.

Figure 2:
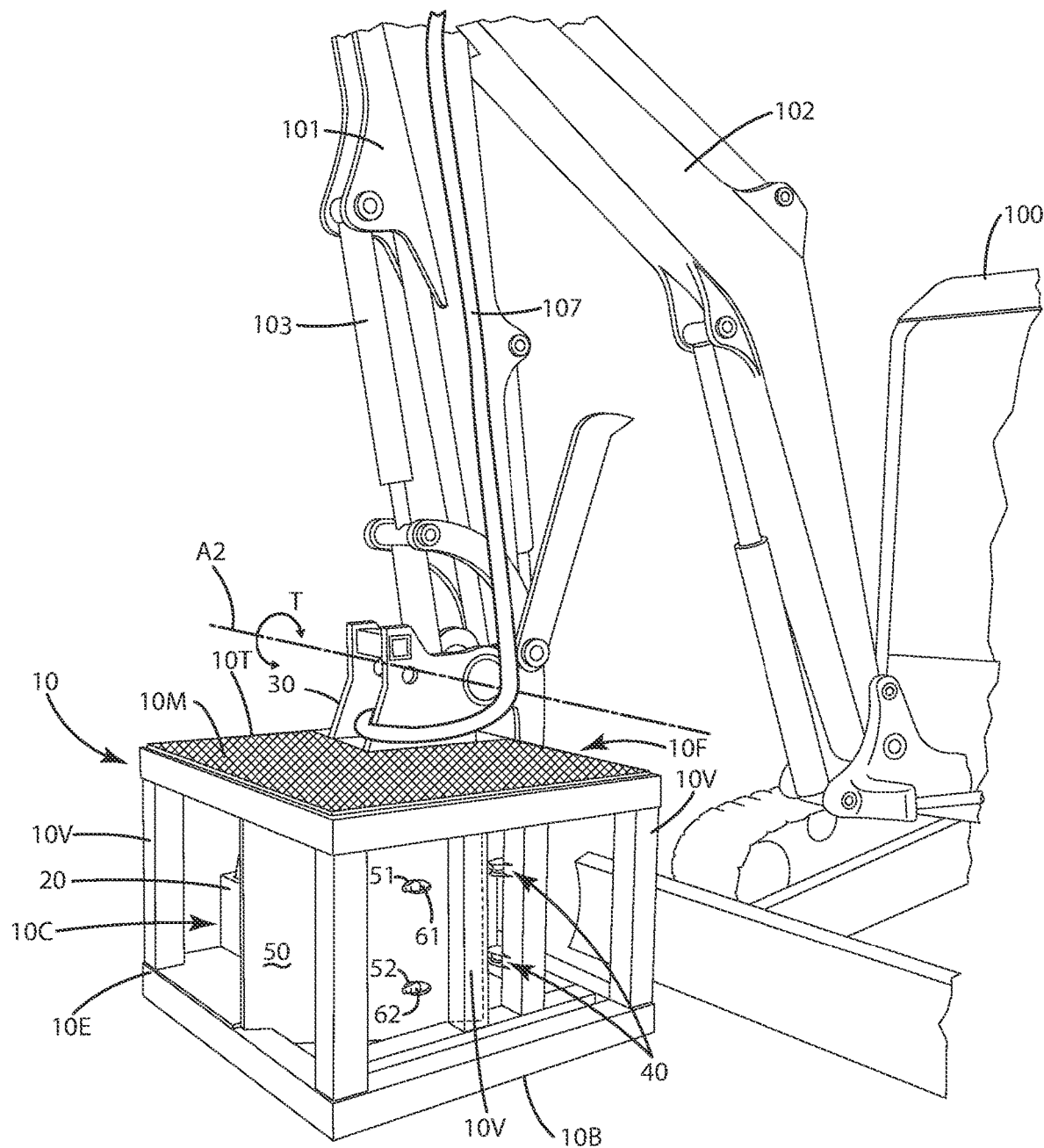
FIG. 2 is a side perspective view of the cable puller installed on an arm of equipment.

The construction and components of the cable puller 10 will now be described in more detail with reference to FIGS. 2-4. The cable puller 10 can include a frame 10F, a winch 20, a frame mount 30, one or more pulleys 40, and optionally a deflector plate 50 and splitter wedges 60. The cable puller frame 10F is constructed from a durable assembly of heavy-duty tubing or structures to protect its components, such as the winch 20 within a compartment 10C. The frame tubing can be constructed from metal, composites or other materials. The frame 10F can be arranged as a generally box like structure. Of course, other shapes can be selected depending on the application. The frame 10F can include a top 10T and a base 10B joined via multiple vertical supports 10V spaced to form the compartment 10C. The top 10T of the frame 10F can be covered optionally with a steel mesh 10M to prevent significant dirt, debris and other objects from entering the compartment 10C from above. This can be useful when the cable puller 10 is disposed in a drawing pit that has unstable soil conditions to prevent dirt from falling onto the spool 21 of the winch 20.

The cable puller frame 10F can include an exit end 10E that is upstream from the spool 21 and other components as described below. The exit end 10E also is configured so that the cable C extends from the cable puller through this end. The cable thus moves through relative to the exit end 10E.

Figure 7:
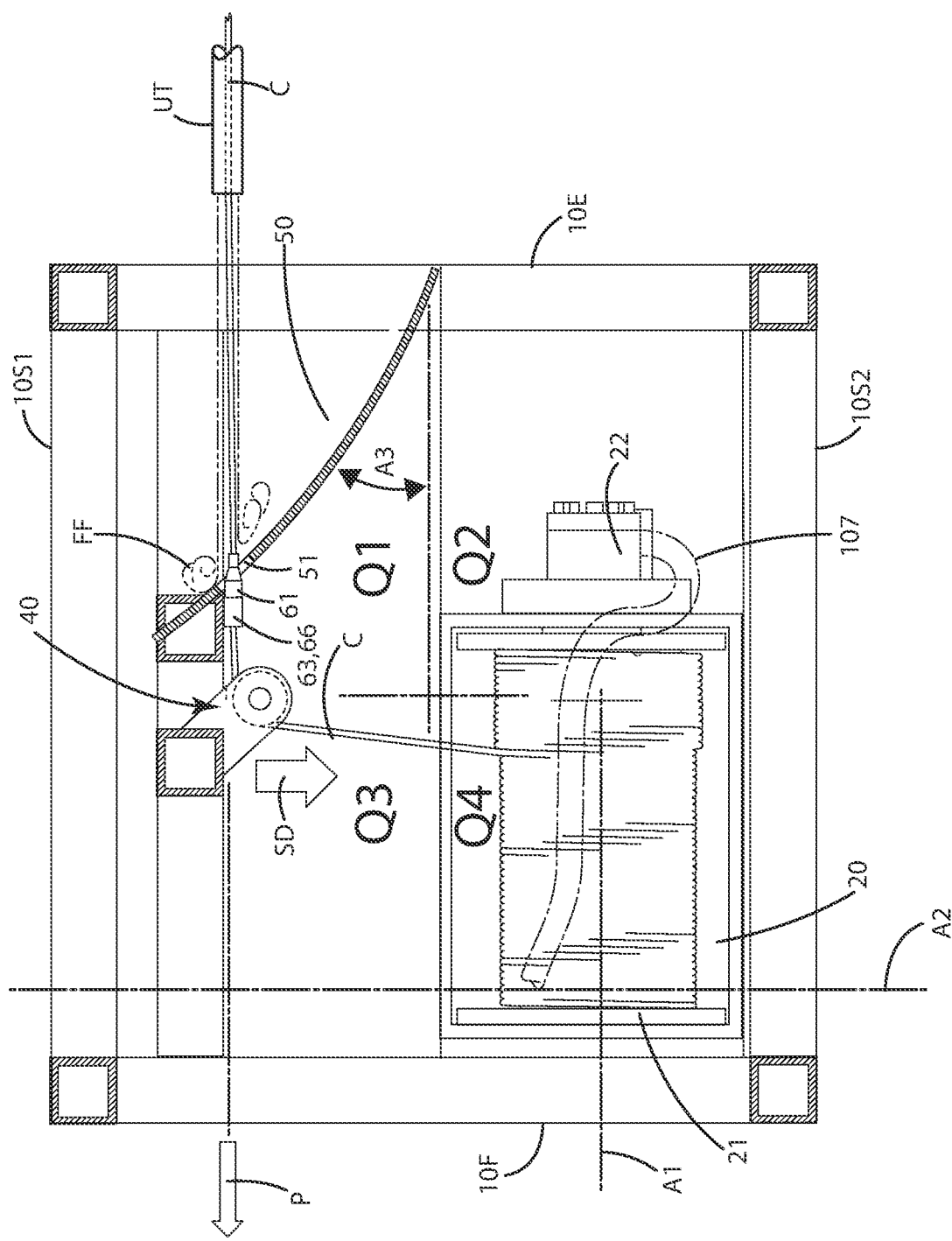
FIG. 7 is a top view of the cable puller in the drawing pit.

The cable puller frame 10F can be configured to house the winch 20. The winch 20 can be mounted to the frame 10F, optionally to the base 10B of the frame 10F. The winch 20 can be oriented so that its spool 21 is well protected within the frame, optionally under the mesh 10M and in the compartment 10C. The spool 21 can include an axis of rotation A1. This axis of rotation A1 can be configured so that it is generally parallel to an axis of pull P of the cable C when the cable projects from the exit end 10E of the frame 10F as shown in FIG. 7. The winch 20 can include a turning element 22 which can rotate the spool 21. The rotating element 22 can be an electric motor, a gas or combustion engine, a hydraulic unit, a pneumatic unit or other elements capable of rotating the spool. As shown in the current embodiment, the rotating element 22 can be in the form of a hydraulic unit that is plumbed to the hydraulic system 105 of the equipment 100. In this manner, the hydraulic unit 22 can be operated by an operator of the equipment via a control unit CU in the cab of the equipment 100, distal from the cable puller 10. The hydraulic unit 22 can be plumbed in the system via a hydraulic line 107 that extends from hydraulic unit 22 to the system 105. Optionally, the winch can include a pressure relief valve on the unit which provides control of the amount of torque that the winch has available. This can prevent breaking the cable which can improve the safety of the unit.

The winch 20 can be mounted in the frame 10F so that when the cable C is loaded and spooled on or off the spool 21, the cable C moves in a spool direction SD that can be transverse to the direction of pull P of the cable C through the underground tubing UT. Optionally, this spool direction SD can be perpendicular to the direction of pull P of the cable C through the underground tubing UT. This redirection of the cable from the pull direction P to the spool direction SD can be provided by one or more pulleys 40 as described below.

As mentioned above, the cable puller 10 is configured to be attached to an arm 101 of the piece of equipment 100. The cable puller 10 can include the frame mount 30 which for example is shown in FIGS. 2-3B. In FIG. 3B, the frame 10F is placed on its side such that the top 10T is perpendicular to ground level GL. As shown in FIG. 3B, the frame mount 30 can include first and second plates 31 and 32. These plates project away from the frame 10F and generally away from the top 10T of the frame 10F. The plates are joined with a connector bar 33 and/or a lock bar 34. The connector bar 33 can be in the form of a cylindrical element such as a tube, and can extend between the plates 31 and 32. The precise construction of the frame mount 30 can be modified to enable the frame 10F to be quietly attached and/or detached from the arm mount 108 associated with the arm 101 of the equipment 100.

Further optionally the arm mount 108 can include an arm mount recess 108R. This recess can be configured so that the connector bar 33 can be received by the recess 108R of the arm mount 108 when the arm mount 108 is moved and registered with the frame mount 30 in the direction of the arrows M as shown. The arm mount 108 also can include a block or other protrusion 108B that fits adjacent the lock bar 34 of the frame mount 30 when the arm mount 108 is installed relative to the frame mount 30.

Optionally, the arm mount can include pins that can be selectively projected outward from the block 108B when installed adjacent the lock bar 34. As a result, when the pins 108P are extended, they are inserted into the pinholes 108PH of the frame mount 30. Optionally, these pins can be actuated by a hydraulic line that is associated with the hydraulic system 105 of the equipment 100. In other applications, the pins 108P can be manual pins that are simply placed manually through the pinholes 108PH to connect the frame mount 30 with the arm mount 108. Again, other constructions and configurations of the frame mount 30 and the arm mount 108 are contemplated to join the frame 10 with the arm 101 of the equipment 100.

Optionally, the frame mount 30 of the cable puller 10 can be constructed so that it can be joined with the arm mount 108 of the arm 101 of the equipment 100 in a generally quick and efficient manner. A variety of different quick attach couplers, can be utilized for this attachment with the frame mount 30 and arm mount 108. Such couplers can include but are not limited to the Bobcat X-Change quick coupler available from Bobcat of West Fargo, N. Dak., the CP Quick Hitch Coupler available from Paladin Attachments of Dexter, Michigan, and others.

The frame mount 30 can securely mount the frame and cable puller to the arm mount 108. As a result of this mounting, the frame 10F and the cable puller 10 can be tilted, pivoted or otherwise rotated about an axis A2 of the arm and/or mount of the equipment 100. This axis A2 of rotation arbitrarily is shown in FIGS. 1, 2, 3A and 3B. This axis of tilting or rotation of the cable puller 10 can vary depending on the set up of the arm, the arm mount and/or frame mount, which again can vary from one piece of equipment to the next. Further, although described as rotating, tilting and/or pivoting about an axis of rotation A2, the frame and cable puller optionally this movement can refer to the rotation, pivoting and/or tilting about one or more axes in a dynamic manner. Optionally, although not shown, the frame mount 30 can be rotatably mounted to the frame 10F, or otherwise reconfigurable relative to the frame so that it effectively can be rotated 90° or 180° from one position to the next. Alternatively, the mount can be duplicated on both ends of the frame. In these cases, such amount can amble the cable puller to be picked up from either side. This can allow the unit to pull a cable from in front of the unit as well as to pull a cable from underneath the unit.

Figure 3A:
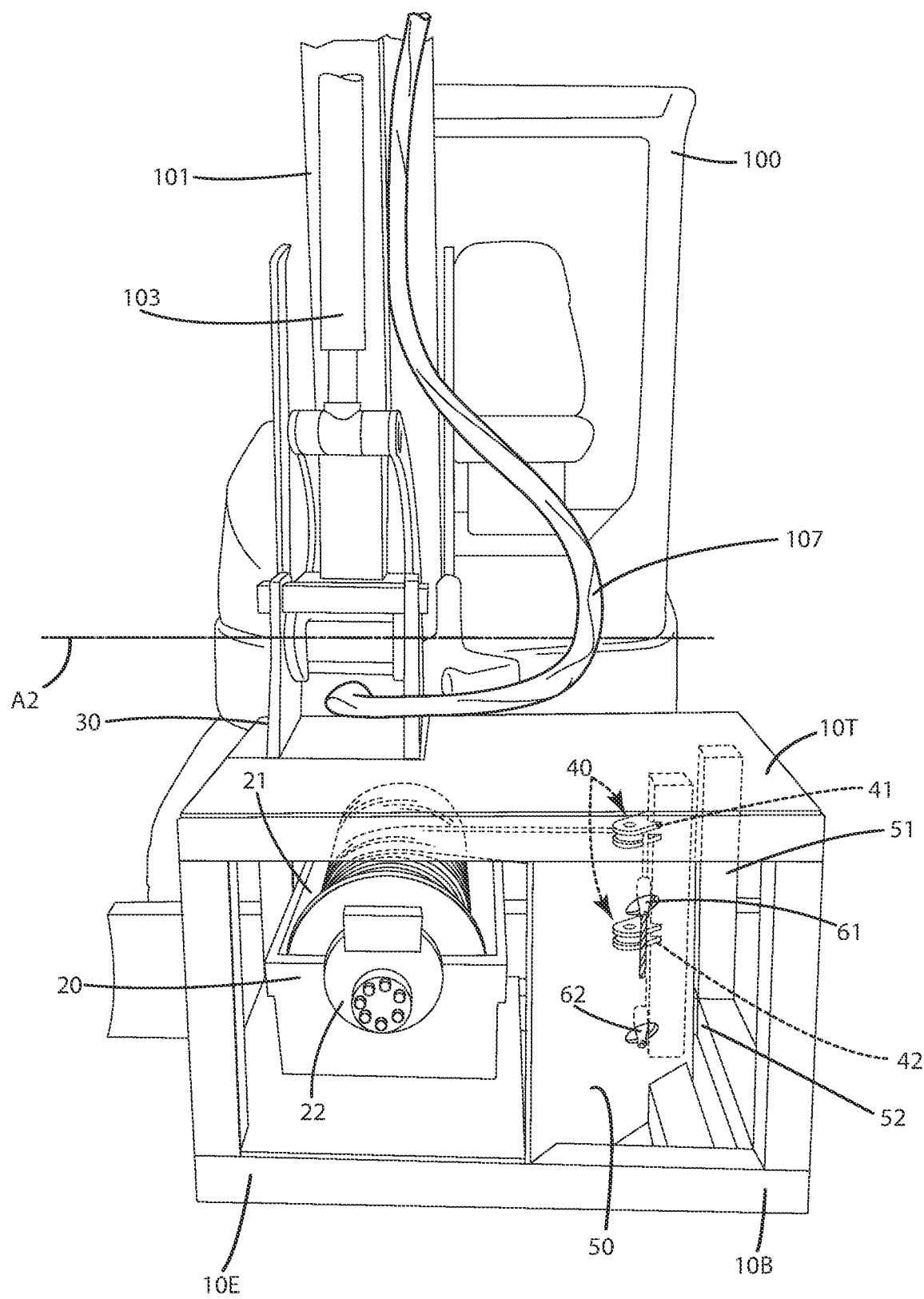
FIG. 3A is an exit end view of the cable puller on the equipment.
Figure 3B:
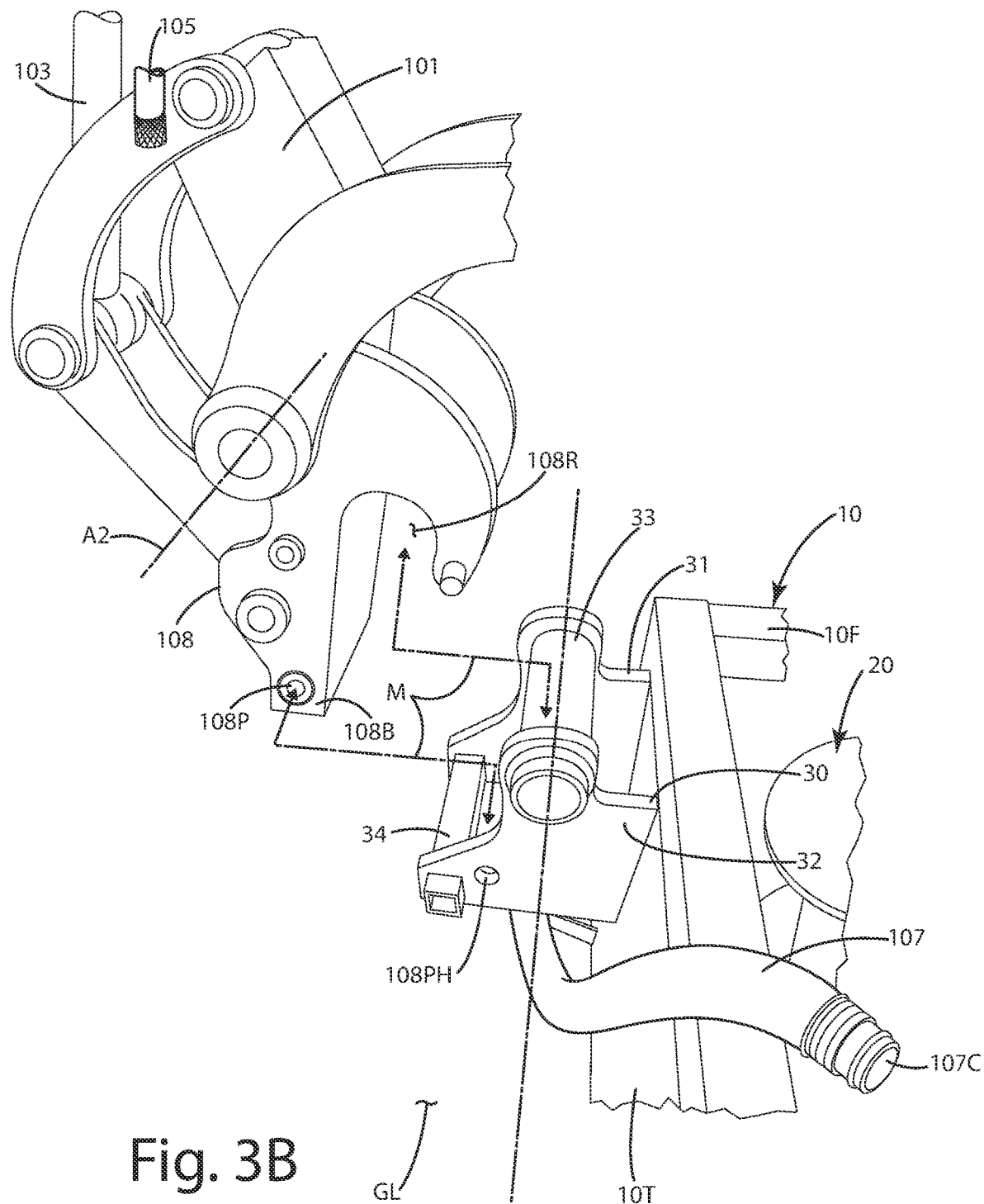
FIG. 3B is a perspective view of a frame mount of the cable puller being joined with an arm mount of the arm of the equipment.

As further shown in FIGS. 3A and 3B, the cable puller 10 can include a hydraulic line 107 that extends to the winch 20 in particular the hydraulic unit 22. This hydraulic line 107 can include a connector end 107C which can be further connected to the hydraulic system 105 of the equipment. This connector end can be in the form of a quick coupler to join the respective parts of the lines.

Figure 6:
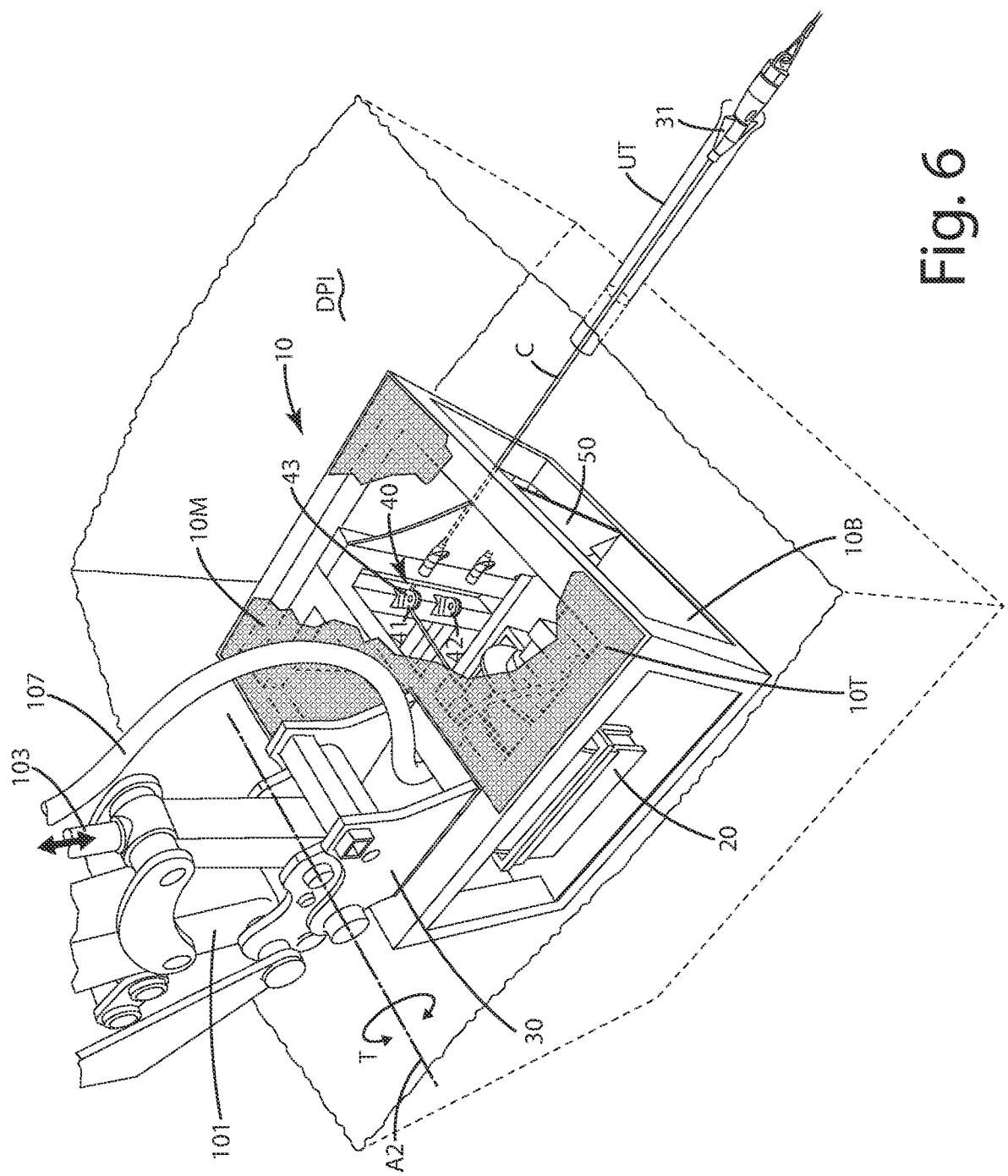
FIG. 6 is a top perspective view of the cable puller in the drawing pit.

The cable puller 10 can include one or more pulleys 40. These pulleys 40 are shown in FIGS. 4, 6 and 7. These pulleys 40 can be included in the cable puller 10 to redirect the cable C as it is pulled from the underground tubing UT in direction P to a spool direction SD. The cable puller also can include more than one pulley, for example 2, 3, 4 or more pulleys. These pulleys, can include a first pulley 41 and a second pulley 42, each joined with a support 10V that extends from the bottom 10B to the top 10T of the frame 10F. These pulleys 41 and 42 can be disposed vertically above and/or below one another. Thus these pulleys 41 and 42 can be disposed at different vertical levels relative to one another. Optionally, these pulleys can be separated by a distance D1 that is less than the full height H1 of the frame 10F, which extends from the bottom 10B to the top 10T of the frame 10F. With the pulleys 40 at different levels, the cable puller 10 can be set in the drawing pit DP1 at a particular level and/or orientation. With two or more pulleys, the cable puller can provide the option of selecting the pulley disposed at a suitable height to align that pulley with the underground tubing, for example the end UT1 of the underground tubing that projects or is exposed in the drawing pit DP1. In this manner, the line of pull P of the cable C through the underground tubing UT can be such that is generally parallel to and aligned with the underground tubing UT. This can prevent the splitting wedge 31 from becoming misaligned with or otherwise binding or jamming in the underground tubing UT as it is pulled through the underground tubing UT. In turn, this can impair and/or prevent pull out of the underground tubing so that the underground tubing UT is not pulled by the splitting wedge 31 into the drawing pit DP1. This also can prevent or impair binding of the splitting wedge 31 so that it does not become bound or stuck relative to the underground tubing UT.

Optionally, each pulley 41 and 42 can be identical and can include pulley tracks 40T that are of a generally U or V shape so that the cable C rides within that track. Each pulley can be mounted with a mounting bracket 43 to the vertical support 10V. The mounting bracket 43 can be welded in place to the vertical support 10B, or alternatively joined with one or more fasteners so that the pulleys and brackets can be easily replaced if damaged. The pulleys 40 can be disposed between the exit end 10E of the frame 10F and the winch 20 mounted in the cable puller. Again this can be so that the pulleys 40 redirect the cable transversely relative to the direction of pull P and toward the spool and pulley. The pulleys can be of a suitable diameter so as to enable the cable to roll easily around the pulleys and reduce wear and tear on the cable, optionally redirecting the cable at least 90°. These pulleys can be of a diameter of optionally between 1 inch and 10 inches, inclusive, further optionally between 1 inch and 5 inches, inclusive yet further optionally between 3 inches and 5 inches inclusive, depending on the application. Of course other diameters can be selected.

Optionally, the cable puller 10 can include a deflector plate 50 as illustrated in FIGS. 4-7. The defector plate can be a uniform sheet or piece of durable material, such as metal. The deflector plate 50 can be disposed between the exit end 10E and the pulleys 40 of the frame. The deflector plate can be disposed between the underground tubing UT in the winch and/or pulleys. The deflector plate 50 as shown can be a curved or angled sheet or plate that extends from the top 10T to the bottom 10B of the frame 10F. Generally, the deflector plate can extend from the bottom to the top of the frame. The deflector plate 50 can be disposed near or adjacent the exit end 10E of the frame 10F and can extend to a vertical support 10V1. The deflector plate 50 generally can extend from the exit end of the frame 10F at an angle A3 relative to the exit end 10E toward the side 10S1 of the frame 10F. This angle A3 can be acute, and can the deflector plate 50 can extend from that exit end toward the side 10S1. The deflector plate however optionally might not extend to the other opposing side 10S2 of the frame 10F. The deflector plate optionally can extend substantially only in a first quadrant Q1 of the frame 10F of the cable puller when viewed from a top view as shown in FIG. 7. This quadrant can form one of four equal sized quadrant areas of the footprint of the frame 10F. Optionally, in other applications, the deflector plate can extend in other quadrants, depending on the application, the configuration of the frame and the location of the winch and its spool. As shown, the deflector plate 50 can be disposed between the underground tubing UT and the pulleys 40. Optionally, the deflector plate 50 can be disposed between the underground tubing UT and the winch 20 of the cable puller.

The deflector plate 50 can be set up so that the cable C passes by and/or through the deflector plate as it extends along the line of pull P toward the pulleys 40 and ultimately toward the winch 20. As shown in FIG. 4, the deflector plate 50 can include first and second 51 and second 52 apertures. These apertures can extend through the deflector plate and can be aligned with the tracks 40T of the pulleys 41 and 42 respectively. These apertures can be constructed so that the cable, when pulled toward the first pulley or the second pulley depending on which one is selected for a particular job, passes through the apertures and thus through the deflector plate as the cable is drawn by the winch and spooled onto the spool. The deflector plate can be set up and configured so that in cases where a portion of the underground tubing UT, for example when an un-fractured or un-split portion of the underground tubing is drawn by the cable C toward the first pulley, that underground tubing UT can engage at least a portion of the deflector plate 50 and be deflected outward from the frame, generally in a direction away from the pulleys and/or the winch. Optionally, the underground tubing UT is deflected off or away from the line of pull P. The deflection of the pulled underground tubing UT can protect the structure of the pulleys and the winch so that the tubing does not ruin, destroy and/or impair the function of those elements.

Figure 4:
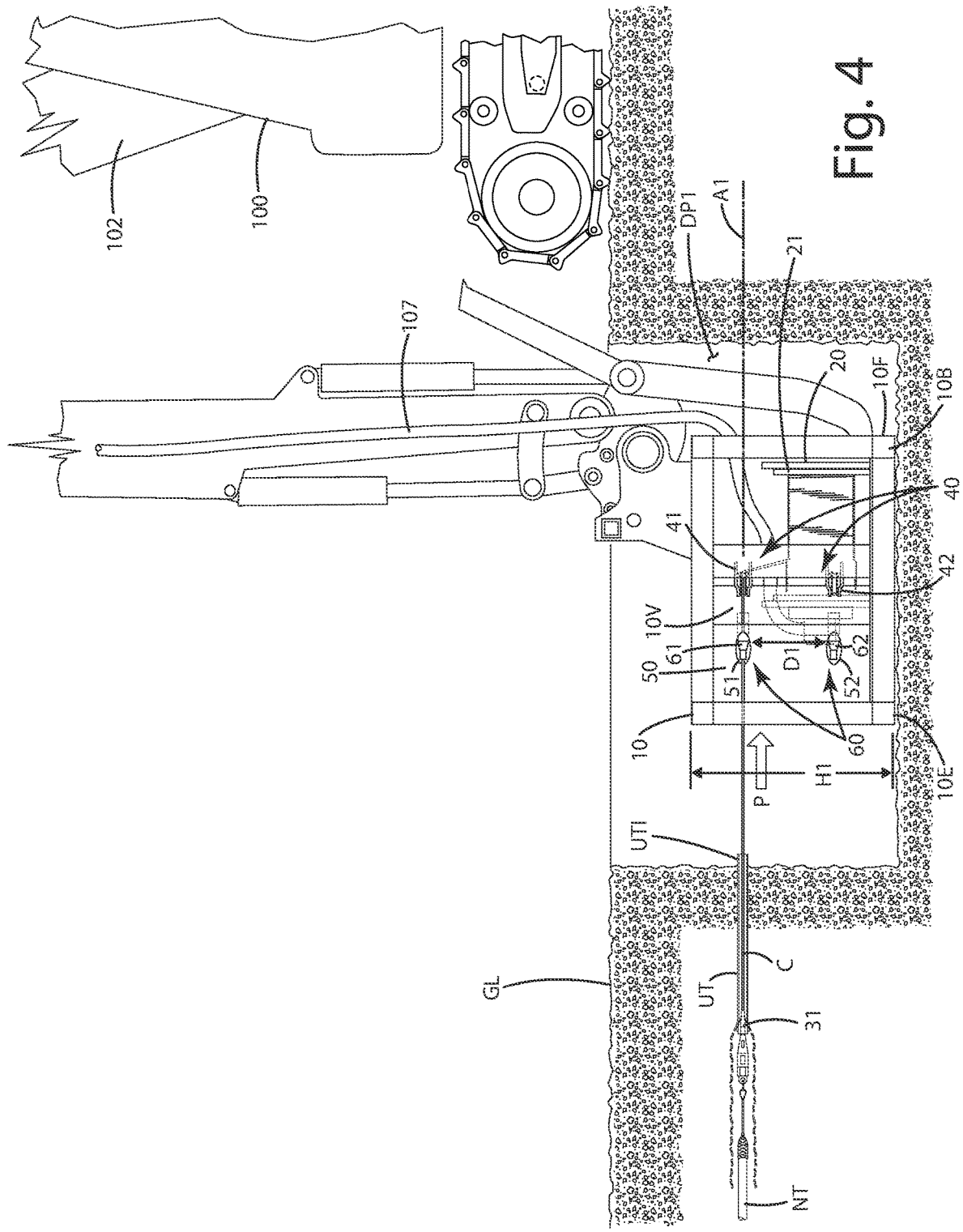
FIG. 4 is a first side view of the cable puller on an excavator arm lowered in a drawing pit with a cable pulling a splitting wedge through an old tubing to fracture the old tubing.

As further illustrated in FIG. 4, the cable puller 10 can be outfitted to include one or more optional second splitting wedges 60, in particular splitting wedges 61 and 62. The splitting wedges are referred to as the second splitting wedge because the cable puller also can include the first splitting wedge 31 that is joined with an end of the cable C that is distal from cable puller and that is pulled in a direction toward the cable puller through the underground tubing to split the underground tubing and otherwise fracture it and/or decommission it. The second splitting wedges 61, 62 can cooperatively align with the tracks on the first 41 and second 42 pulleys. The cable C can be configured so that it runs through or adjacent one of these second splitting wedges on its path toward the cable track 40T of the respective pulleys 41 or 42, depending on which pulley the cable is engaged with. As illustrated, the cable C is aligned with the first pulley 41 which is higher than the second pulley 42. Thus, the cable extends through the second splitting wedge 61 rather than the other lower second splitting wedge 62 which is aligned with the second pulley 42.

Generally, the first splitting wedge 31 and the second splitting wedges 61 and 62 can be identical in shape and configuration. However, the first and second splitting wedges can face toward one another with their tapered ends facing one another when the cable is being pulled with the cable puller. Further, each of the second splitting wedges 61, 62 can be fixedly, securely and/or immovably joined with the frame 10F of the cable puller, and located generally between the pulleys 40 and the exit end 10E of the frame 10F.

Figure 5:
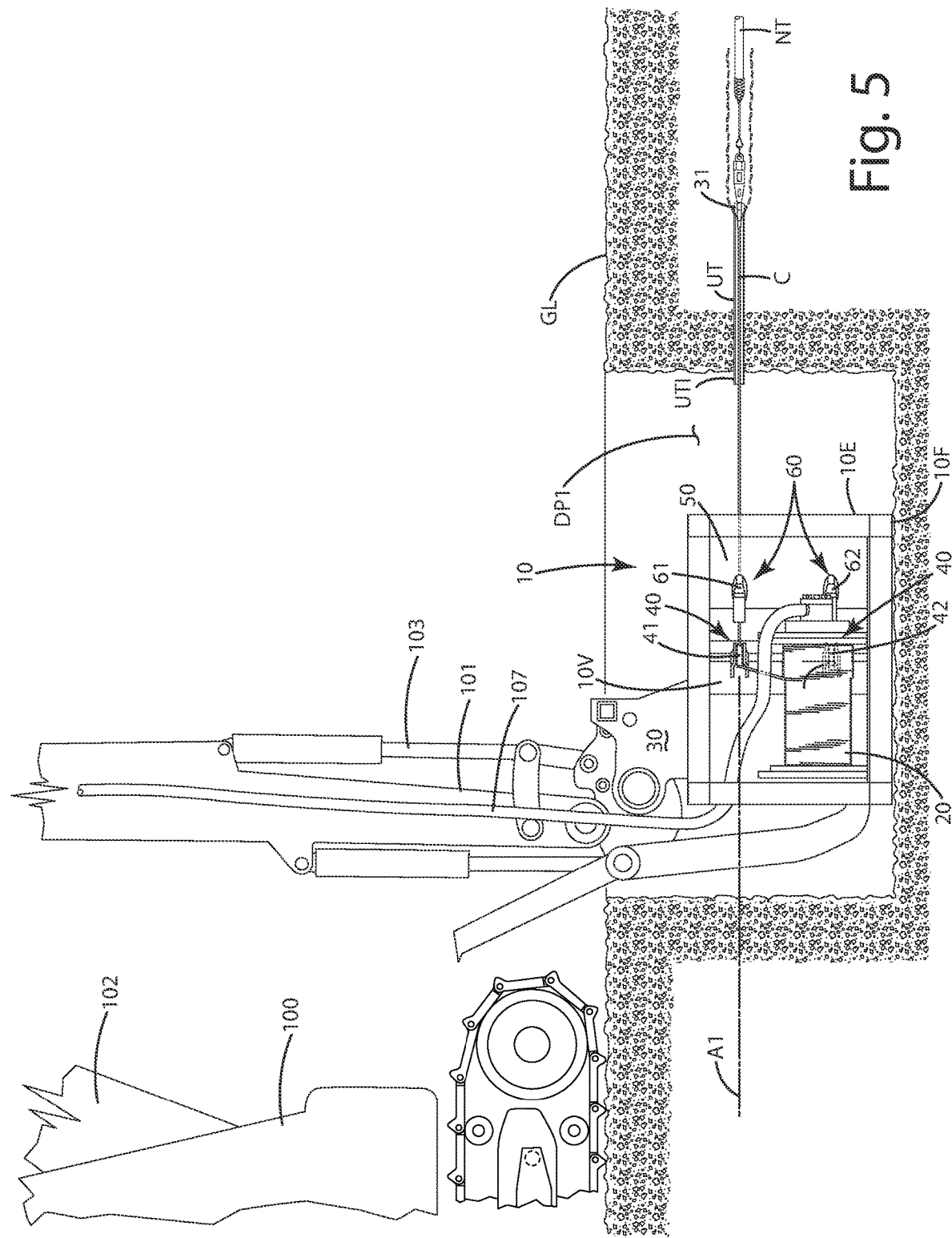
FIG. 5 is an opposite side view thereof.
Figure 8:
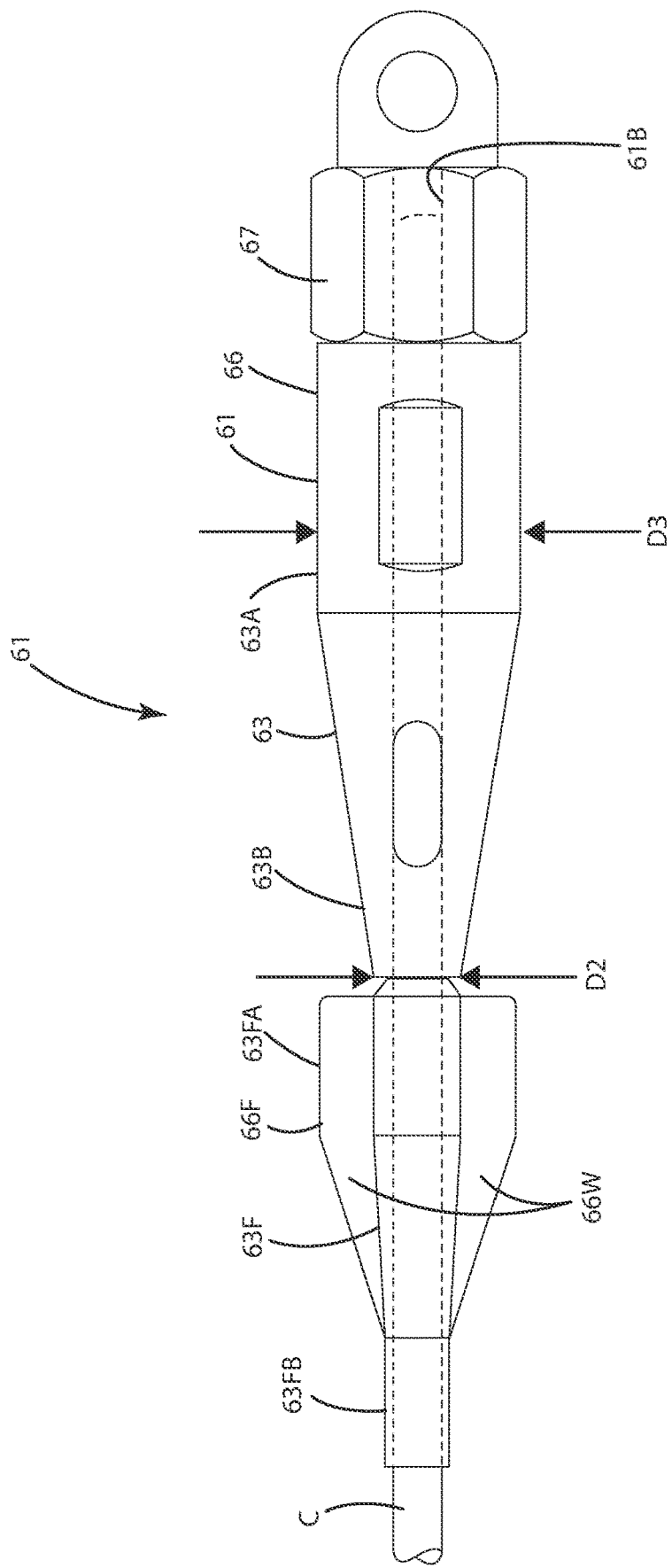
FIG. 8 is a close up of the splitting wedge used with the cable puller.

With reference to FIGS. 4, 5 and 8, the second splitting wedges will be described in more detail. It will be appreciated that the first splitting wedge has a similar or identical construction, but is generally faced toward the second splitting wedge when mounted to the cable. This is so that each of the respective splitting wedges is configured to split the underground tubing when these respective wedges come in contact with that underground tubing.

In particular, the second splitting wedge, for example, splitting wedge 61 can include a splitting wedge body 66. The splitting wedge body 66 can define a cable bore 62 through which the cable can be extended. The wedge body 66 can include a tapered surface 63 that tapers from a first end 63A toward a second end 63B. The first end 63A can have a first dimension D3, which optionally can be a diameter. The second end 63B can have a second dimension D4, which optionally can be a diameter. The second dimension can be less than the first dimension so that the surface 63 generally tapers toward the second end 63B, from the first end 63A, generally reducing in size and dimension in doing so. This second end 63B can point away from the pulleys 40. In particular as shown, the second end 63B can point away from the first pulley 41. Optionally, the first splitting wedge 31 can have a similar tapered surface with a smaller end 31B. Again, that smaller end of the first splitting wedge can face toward and point toward the smaller and 63B of the second splitting wedge 61. Optionally, the surface 63 can be a frustoconical form. In other embodiments, it can be angled or of other shapes but generally can be tapered toward the end 63B, reducing in dimension or tapered toward the end 63B.

The wedge body 66 can be attached to a base 67. This base 67 can be in the form of a nut or other fastener. This base 67 can be fixedly mounted to and/or joined with the vertical support 10V1. The base optionally can be welded, fastened or otherwise secured to that vertical element of the frame 10F. In some cases, the wedge body 66 can rotate relative to the base about an axis that is coaxial with the cable. The wedge body 66 can be considered rotatable, yet still is considered to be fixedly joined with the frame and/or stationary. The wedge body 66 can also be mounted generally between the exit end 10E and the winch, and generally forward of the pulleys 40.

The second splitting wedges can include a floating wedge body 66F in addition to the fixed wedge body 66. As shown in FIG. 8, the floating wedge body 66F can include a tapered surface 63F the tapers toward a smaller second end 63FB from a larger first end 63FA. This floating wedge also can define a cable bore 61FB through which the cable C can extend. This floating wedge body 66F can float on the exterior surface 63 of the wedge body 66. Thus, it can rotate and move relative to that body 66. This floating body 66F also can include one or more fins 66W that operate to split or fracture the underground tubing UT when it is dragged with the cable C over the second splitting wedge 61. As a result, this splitting wedge, and the respective components thereof, can operate to fracture an un-fractured portion of the underground tubing as the cable is drawn toward the first pulley, particularly when the underground tubing catches on and is pulled with the cable and/or the first splitting wedge 31. In turn, this can prevent the underground tubing UT from traveling with the cable to the pulley and/or the winch, which could impair or prevent proper functioning of these elements. With this mechanism, an operator of the cable puller also need not manually strip underground tubing that may be caught on the cable C as it is pulled.

A method of using the cable puller 10 of the current embodiment will now be described in further detail with reference to FIGS. 1, 3B and 4. As provided above, the cable puller 10 can be utilized to engage in situ underground tubing UT that is buried in soil S. The underground tubing can be old tubing, which is no longer suitable for use. In that regard, the tubing can be decommissioned using the cable puller. For example, it can be fractured, split, ruptured or otherwise rendered un-useful with the cable puller, and in particular the first splitting wedge 31 that is drawn through the underground tubing as described below. The first splitting wedge 31 also can be connected to new tubing NT which is ultimately pulled through the space in the ground where the UT was located with the cable C.

As mentioned above, the cable puller 10 can be joined with an arm 101 of a piece of equipment 100 shown as an excavator. With reference to FIG. 3B, the arm mount 108 can be hooked up to the frame mount 30 of the cable puller, optionally while the cable puller is above ground level GL. From there, the hydraulic line 107 joined with the hydraulic unit of the winch 20 can be coupled to the hydraulic system 105 of the equipment 100. After the hookup is completed, the equipment 100 can be controlled so as to move the arm 101 toward and/or lowered into the drawing pit DP1. During this movement, the hydraulic system 105 can be used to move, for example tilt, rotate and/or otherwise pivot the arm mount 108, which in turn does the same to the attached frame mount 30. As a result of this movement, which again can be effectuated by the ram 103 of the arm, the cable puller 10 can be tilted, pivoted rotated or otherwise reoriented about one or more axes A2.

The cable puller can be lowered into the drawing pit DP1 below ground level GL with the arm 101. Portions of the arm, for example, part of the ram and/or the arm mount 108, can be lowered into the drawing pit DP1 below ground level GL with the cable puller. In some cases of course, where the pit is rather shallow and the underground tubing is close to ground level, portions of the arm and cable puller might not be below ground level. One or more of the pulleys 40 however can be disposed below ground level as described below.

During or after the movement and disposal of the cable puller partly or entirely below ground level, the cable puller can be situated so as to align one of the pulleys 40 with the underground tubing UT. For example, the arm can be lowered into the pit so as to align a pulley track 40T with the end UT1 of the underground tubing that projects or is otherwise exposed in the drawing pit DP1. The operator or a worker in the drawing pit DP1 can view the orientation of the cable puller and pulleys to select which pulley, that is, either the first pulley or the second pulley, that is closest to the underground tubing UT. For example, the underground tubing may be exposed higher in the drawing pit DP1, closer to ground level. In this case, the arm can be moved so as to move the cable puller such that the first pulley aligns generally with the underground tubing, optionally in line with a direction of pulled P. When the first pulley is selected, the second pulley is not selected by the worker for use during a particular cable pull.

The cable puller 10 can be pivoted, tilted or otherwise rotated about one or more axes, for example the axis A2. This tilting can be performed while the cable puller is at least partially disposed in the drawing pit DP1. This tilting can be performed also so as to align the selected pulley, for example, the first pulley, with the underground tubing. The tilting and pivoting of the cable puller can be affected to level the cable puller and the frame relative to the underground tubing so as to provide a generally straight line of pull P when the winch is operated to spool the cable onto it, thus pulling the cable through the underground tubing. Optionally, the first pulley and the second pulley are rotatably mounted to the frame of the cable puller in a substantially horizontal orientation when the winch is pulling the cable.

During most if not all of the duration while the cable puller is pulling a cable through the underground tubing, the arm, arm mount and cable puller can be substantially stationary within the drawing pit DP1. In this manner, the arm, arm mount and frame are not moved toward and/or away from the underground tubing, and otherwise are not moved around in the pit after the puller is satisfactorily positioned. The winch and pulleys, however, rotate while these other components remain disposed in a static configuration during a cable pull.

As mentioned above, the cable C is strung through the underground tubing UT from the second pit DP2 to the first pit DP1. The cable is then strung through the selected pulley and in particular a cable track 40T of the first pulley 41 which is aligned with the underground tubing UT in the drawing pit DP1. The cable is then strung in attached to the spool 21 of the winch 20. The winch can be powered by the hydraulic unit to rotate the spool. As mentioned above, the hydraulic unit is plumbed to the hydraulic system 105 of the equipment 100. Due to this, an operator in a cab of the equipment can operate the control unit CU tied into the hydraulic system to run the hydraulic unit and rotate the spool, all while the operator is in the cab of the equipment.

In operation, the operator will actuate the winch 20 via the control unit CU on the equipment. This in turn conveys hydraulic fluid to and from the winch 20 through the hydraulic line 107. This causes the hydraulic unit 22 to hydraulically rotate the spool 21. This draws the cable C onto the spool. As a result, the cable C is pulled along a line of pull P. As the cable is pulled, the arm and cable puller remain stationary in the drawing pit. The arm in general does not move relative to the equipment or the drawing pit so as to maintain alignment of a selected pulley with the underground tubing. The cable rotates the associated pulley 41, writing in the track 40T of the pulley. The pulley redirects the cable from the line of pull P to the spool direction SD within the cable puller, optionally in the compartment 10C. The cable pulls the splitting wedge 31 through the underground tubing UT. The splitting wedge splits, fractures or otherwise expands the underground tubing. Where the splitting wedge 31 is joined with new tubing, then new tubing is also drawn through the space in the ground where the underground tubing UT once was located, depositing that new tubing adjacent parts of the split and/or fractured underground tubing.

This operation continues until the underground tubing is decommissioned and/or any new tubing is installed completely between the drawing pits. The cable pulling also can continue until the first wedge splitter 31 enters the first drawing pit DP1, optionally with the new tube NT attached thereto. At that point, the first splitter wedge can be detached from the new tube. The cable puller can be lifted from the pit with the arm and to another location on the site. Optionally, the cable puller can be detached from the arm, and the bucket BK can be reattached to the arm. The equipment can be used to fill in the drawing pits after the new tubing is sufficiently installed.

Where the cable puller includes the deflector plate 50, before the cable is placed around a cable track 40T, the cable C can be placed through an aperture, for example aperture 51 of the deflector plate, then routed to the pulley 41. Again this first aperture can be aligned with the first pulley and can accommodate the cable moving through that first aperture toward the pulley 41.

Where the cable puller includes one or more second splitting wedges 61, 62, the cable can be selectively placed through a bore of one of those wedges and directed toward the selected pulley for a particular cable pull operation. As noted above, the second splitting wedge 61 can include a floating wedge body 66F and a stationary wedge 66. The cable can be threaded through the cable bore 61FB of the floating wedge body 66F, then through the cable bore 67B of the wedge body 66. The tapered surfaces of the respective wedge body 66 and the floating body 63F can be tapered so that they point in a second direction generally away from the pulleys and or the deflector plate. When pointing in this direction, the second splitting wedge generally points toward the first splitting wedge. Thus, the first and second splitting wedges are slidably mounted to the cable but point toward one another and toward the underground tubing UT during a cable draw.

Further, the second splitting wedge points in a direction opposite the line of pull P as shown in FIG. 7. The second splitting wedge is oriented as such to address a portion of the underground tubing UT that might be drawn out as the first splitting wedge 31 is pulled with the cable through the underground tubing and catches on the underground tubing. For example, if the tubing UT begins to move along with the first splitting wedge 31 and the cable, that underground tubing can become stationary relative to the cable and that wedge. Thus, the underground tubing begins to move with those elements toward the cable puller. As shown in FIG. 7, eventually, during the cable pull along the line P toward the cable puller, an un-fractured portion UF of the underground tubing UT can be pulled toward the deflector plate 50 such that it begins to engage or contact the deflector plate and/or the second splitting wedge.

When the un-fractured portion of the underground tubing is engaged against the second splitting wedge, via the first splitting wedge drawing that portion toward the second splitting wedge such that the tubing is trapped between the first and second splitting wedges, the second splitting wedge can operate to either stop movement of the un-fractured portion of the underground tubing such that the first splitting wedge can continue splitting that un-fractured portion, or the second splitting wedge can operate to fracture the un-fractured portion as the cable and first splitting wedge are drawn toward the first pulley. Where the second splitting wedge 61 includes a frustoconical surface, for example, on the wedge body 66 or the floating body 66F, that frustoconical surface can engage the inside of the underground tubing and operate to split it apart. Where the floating wedge body 66F is included, it can rotate, or move relative to the wedge body 66. The fins 63F of the floating wedge body 66F also can operate to engage and fracture or otherwise split the underground tubing as the underground tubing passes over the surfaces of that floating wedge.

As the underground tubing UT engages the second splitting wedge, the fractured parts FF of the underground tubing begin to split off the cable. Those fractured parts FF can engage the deflector plate 50 so as to deflect those parts away from the cable, the cable pulley and/or the winch to protect the cable pulley in the winch. These fractured parts FF thus do not pass through the aperture of the deflector plate. These fractured parts also can fall away from the cable puller as they are split off the underground tubing UT. These fractured parts FF can agglomerate in the drawing pit because the second splitting wedge and deflector plate remove this un-fractured portion of the underground tubing, a worker need not do so. Of course, a user might remove the fractured parts from the drawing pit for other reasons.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

What is claimed is:

1. A cable puller adapted to engage underground tubing, the cable puller comprising:
   a frame;
   a first pulley rotatably mounted to the frame;
   a winch including a rotatable spool, the winch mounted to the frame;
   a cable extending from the spool around a portion of the first pulley and out an exit end of the frame;
   a first splitter wedge joined with a distal end of the cable and configured to split an underground tubing when pulled through the underground tubing;

a frame mount joined with the frame and configured to movably join the frame with an arm having a hydraulic ram; and a deflector plate disposed between the first pulley and the exit end of the frame, the deflector plate defining a first aperture, with the cable extending through the first aperture, wherein the frame is pivotable about an axis of rotation via the hydraulic ram to align the first pulley with the underground tubing, wherein the winch is operable to pull the cable and thereby pull the cable over the first pulley so the first pulley rotates and so the first splitter wedge attached to the cable is drawn through the underground tubing to split a portion of the underground tubing, wherein the first pulley redirects the cable toward the winch at a location between the winch and the deflector plate, wherein the deflector plate is configured to deflect the underground tubing pulled toward the first pulley in a direction away from the first pulley to protect the first pulley and prevent the underground tubing from contacting the winch.

2. The cable puller of claim 1, comprising: the deflector plate mounted to the frame, wherein the first pulley is located between the deflector plate and the winch.

3. The cable puller of claim 2, wherein the deflector plate is between the winch and the underground tubing.

4. A cable puller adapted to engage underground tubing, the cable puller comprising:

a frame;

a first pulley rotatably mounted to the frame;

a winch including a rotatable spool, the winch mounted to the frame;

a cable extending from the spool around a portion of the first pulley and out an exit end of the frame;

a first splitter wedge joined with a distal end of the cable and configured to split an underground tubing when pulled through the underground tubing; and a frame mount joined with the frame and configured to movably join the frame with an arm having a hydraulic ram;

a second pulley disposed below the first pulley and rotatably mounted to the frame; and a second splitter wedge including a wedge body defining a cable bore and a frustoconical surface that extends from a first end having a first dimension to a second end having a second dimension less than the first dimension so the frustoconical surface tapers toward the second end, wherein the frame is pivotable about an axis of rotation via the hydraulic ram to align the first pulley with the underground tubing, wherein the winch is operable to pull the cable and thereby pull the cable over the first pulley so the first pulley rotates and so the first splitter wedge attached to the cable is drawn through the underground tubing to split a portion of the underground tubing, wherein the wedge body is fixedly disposed forward of the second pulley, wherein the second end points away from the second pulley.

5. A cable puller adapted to engage underground tubing, the cable puller comprising:

a frame;

a first pulley rotatably mounted to the frame;

a winch including a rotatable spool, the winch mounted to the frame;

a cable extending from the spool around a portion of the first pulley and out an exit end of the frame;

a first splitter wedge joined with a distal end of the cable and configured to split an underground tubing when pulled through the underground tubing;

a deflector plate between the winch and the underground tubing, forward of the first pulley; and a frame mount joined with the frame and configured to movably join the frame with an arm having a hydraulic ram, wherein the frame is pivotable about an axis of rotation via the hydraulic ram to align the first pulley with the underground tubing, wherein the winch is operable to pull the cable and thereby pull the cable over the first pulley so the first pulley rotates and so the first splitter wedge attached to the cable is drawn through the underground tubing to split a portion of the underground tubing, wherein the first pulley is located between the deflector plate and the winch.

6. A cable puller adapted to engage underground tubing, the cable puller comprising:

a frame;

a first pulley rotatably mounted to the frame;

a winch including a rotatable spool, the winch mounted to the frame;

a cable extending from the spool around a portion of the first pulley and out an exit end of the frame;

a first splitter wedge joined with a distal end of the cable and configured to split an underground tubing when pulled through the underground tubing;

a frame mount joined with the frame and configured to movably join the frame with an arm having a hydraulic ram;

a deflector plate joined with the frame; and a second pulley joined with the frame, wherein the frame is pivotable about an axis of rotation via the hydraulic ram to align the first pulley with the underground tubing, wherein the winch is operable to pull the cable and thereby pull the cable over the first pulley so the first pulley rotates and so the first splitter wedge attached to the cable is drawn through the underground tubing to split a portion of the underground tubing, wherein the deflector plate includes a first aperture aligned with the first pulley and a second aperture aligned with the second pulley, wherein each of the first aperture and the second aperture configured to accommodate the cable, and direct the cable toward either the first pulley or the second pulley, so that the cable engages either the first pulley or the second pulley, but not both the first pulley and the second pulley simultaneously.

7. A cable puller adapted to engage underground tubing, the cable puller comprising:

a frame;

a first pulley rotatably mounted to the frame;

a winch including a rotatable spool, the winch mounted to the frame;

a cable extending from the spool around a portion of the first pulley and out an exit end of the frame;

a first splitter wedge joined with a distal end of the cable and configured to split an underground tubing when pulled through the underground tubing;

a frame mount joined with the frame and configured to movably join the frame with an arm having a hydraulic ram;
a second pulley mounted distal from the first pulley; and
a deflector plate adjacent the first pulley and the second pulley,
wherein the frame is pivotable about an axis of rotation via the hydraulic ram to align the first pulley with the underground tubing,
wherein the winch is operable to pull the cable and thereby pull the cable over the first pulley so the first pulley rotates and so the first splitter wedge attached to the cable is drawn through the underground tubing to split a portion of the underground tubing,
wherein the first pulley and the second pulley are disposed between the deflector plate and the winch.

8. A cable puller adapted to engage underground tubing, the cable puller comprising:
a frame;
a first pulley rotatably mounted to the frame;
a winch including a rotatable spool, the winch mounted to the frame;
a cable extending from the spool around a portion of the first pulley and out an exit end of the frame;
a first splitter wedge joined with a distal end of the cable and configured to split an underground tubing when pulled through the underground tubing; and
a frame mount joined with the frame and configured to movably join the frame with an arm having a hydraulic ram,
wherein the frame is pivotable about an axis of rotation via the hydraulic ram to align the first pulley with the underground tubing,
wherein the winch is operable to pull the cable and thereby pull the cable over the first pulley so the first pulley rotates and so the first splitter wedge attached to the cable is drawn through the underground tubing to split a portion of the underground tubing,
wherein the spool has an axis of rotation,
wherein the axis of rotation is parallel to a line of pull of the cable as the winch pulls the cable.

9. A cable puller adapted to engage underground tubing, the cable puller comprising:
a frame;
a first pulley rotatably mounted to the frame;
a winch including a rotatable spool, the winch mounted to the frame;
a cable extending from the spool around a portion of the first pulley and out an exit end of the frame;
a first splitter wedge joined with a distal end of the cable and configured to split an underground tubing when pulled through the underground tubing; and
a frame mount joined with the frame and configured to movably join the frame with an arm having a hydraulic ram,
wherein the frame is pivotable about an axis of rotation via the hydraulic ram to align the first pulley with the underground tubing,
wherein the winch is operable to pull the cable and thereby pull the cable over the first pulley so the first pulley rotates and so the first splitter wedge attached to the cable is drawn through the underground tubing to split a portion of the underground tubing,
wherein an axis of rotation of the first pulley is substantially vertical while the winch is pulling the cable.

10. A cable puller adapted to engage underground tubing comprising:
a frame;
a first pulley rotatably mounted to the frame;
a winch including a rotatable spool, the winch mounted to the frame;
a cable extending from the spool around a portion of the first pulley;
a first splitter wedge joined with a distal end of the cable and configured to split an underground tubing when pulled through the underground tubing; and
a frame mount joined with the frame and configured to movably join the frame with an arm having a hydraulic ram so that the hydraulic ram can move and position the frame in a predetermined orientation relative to the underground tubing while the frame is disposed in a drawing pit,
wherein the frame is pivotable about an axis of rotation via the hydraulic ram to align the first pulley with the underground tubing while the frame is disposed in the drawing pit,
wherein the winch is operable to pull the cable and thereby pull the cable over the first pulley so the first pulley rotates and so the first splitter wedge splits a portion of the underground tubing,
wherein the spool has an axis of rotation,
wherein the axis of rotation is parallel to a line of pull of the cable as the winch pulls the cable.

11. The cable puller of claim 10, comprising:
a deflector plate mounted to the frame,
wherein the first pulley is located between the deflector plate and the winch.

12. The cable puller of claim 11,
wherein the deflector plate is between the winch and the underground tubing.

13. A cable puller adapted to engage underground tubing comprising:
a frame;
a first pulley rotatably mounted to the frame;
a winch including a rotatable spool, the winch mounted to the frame;
a cable extending from the spool around a portion of the first pulley;
a first splitter wedge joined with a distal end of the cable and configured to split an underground tubing when pulled through the underground tubing; and
a frame mount joined with the frame and configured to movably join the frame with an arm having a hydraulic ram so that the hydraulic ram can move and position the frame in a predetermined orientation relative to the underground tubing while the frame is disposed in a drawing pit,
wherein the frame is pivotable about an axis of rotation via the hydraulic ram to align the first pulley with the underground tubing while the frame is disposed in the drawing pit,
wherein the winch is operable to pull the cable and thereby pull the cable over the first pulley so the first pulley rotates and so the first splitter wedge splits a portion of the underground tubing,
wherein an axis of rotation of the first pulley is substantially vertical while the winch is pulling the cable.

14. A cable puller adapted to engage underground tubing comprising:
a frame;
a first pulley rotatably mounted to the frame;
a winch including a rotatable spool, the winch mounted to the frame;

a cable extending from the spool around a portion of the first pulley;

a first splitter wedge joined with a distal end of the cable and configured to split an underground tubing when pulled through the underground tubing;

a deflector plate mounted to the frame such that the deflector plate is at an angle offset to a line of pull of the cable and to an axis of rotation of the first pulley; and a frame mount joined with the frame and configured to movably join the frame with an arm having a hydraulic ram so that the hydraulic ram can move and position the frame in a predetermined orientation relative to the underground tubing while the frame is disposed in a drawing pit, wherein the frame is pivotable about an axis of rotation via the hydraulic ram to align the first pulley with the underground tubing while the frame is disposed in the drawing pit, wherein the winch is operable to pull the cable and thereby pull the cable over the first pulley so the first pulley rotates and so the first splitter wedge splits a portion of the underground tubing, wherein the deflector plate is disposed between the first pulley and the underground tubing while the winch pulls the cable to protect the first pulley from the underground tubing.

15. A cable puller adapted to engage underground tubing comprising:

a frame;

a first pulley rotatably mounted to the frame;

a winch mounted to the frame;

a cable extending from the winch around a portion of the first pulley;

a deflector plate mounted to the frame transverse to a line of pull of the cable with the cable passing through an aperture defined through the deflector plate, the first pulley being located between the deflector plate and the winch;

a first splitter wedge joined with a distal end of the cable; and a wedge body disposed adjacent the deflector plate so the cable passes through the wedge body before passing through the deflector plate, wherein the winch is operable to pull the cable and thereby pull the cable over the first pulley so the first pulley rotates and so the first splitter wedge splits a portion of the underground tubing.

16. The cable puller of claim 15, wherein the deflector plate is between the winch and the underground tubing.

17. A cable puller adapted to engage underground tubing comprising:

a frame;

a first pulley rotatably mounted to the frame;

a winch mounted to the frame;

a cable extending from the winch around a portion of the first pulley;

a first splitter wedge joined with a distal end of the cable; and a deflector plate disposed between the first pulley and the winch, the cable extending through the deflector plate, wherein the winch is operable to pull the cable and thereby pull the cable over the first pulley so the first pulley rotates and so the first splitter wedge splits a portion of the underground tubing, wherein the winch includes a spool having an axis of rotation, wherein the axis of rotation is parallel to a line of pull of the cable as the winch pulls the cable.

\* \* \* \* \*